United States Patent [19]

Hsu et al.

[11] Patent Number: 4,812,319
[45] Date of Patent: Mar. 14, 1989

[54] METHOD FOR MAKING PACKAGE HAVING OIL-CONTAINING PRODUCT

[75] Inventors: Joseph C. Hsu, Neenah; Robert A. Steen, Appleton, both of Wis.

[73] Assignee: American National Can Company, Chicago, Ill.

[21] Appl. No.: 70,094

[22] Filed: Jul. 6, 1987

Related U.S. Application Data

[60] Continuation of Ser. No. 773,085, Sep. 4, 1985, abandoned, which is a continuation of Ser. No. 611,482, May 17, 1984, abandoned, which is a division of Ser. No. 464,691, Feb. 7, 1983, Pat. No. 4,491,598.

[51] Int. Cl.$^4$ .................. B65D 30/08; B32B 27/08
[52] U.S. Cl. .................. 426/127; 53/172; 156/243; 156/244.11; 206/524.2; 426/106; 426/415; 428/349; 428/476.1; 428/483; 428/516; 428/35.4
[58] Field of Search .............. 426/126, 127, 415, 106, 426/392; 206/524.2, 484.2; 229/3.5 R; 428/35, 36, 476.1, 483, 516, 349; 156/244.11, 244.18, 244.19, 243; 53/170, 172

[56] References Cited

U.S. PATENT DOCUMENTS

| | | | |
|---|---|---|---|
| 3,274,004 | 9/1966 | Curler et al. | 156/244.11 X |
| 3,502,541 | 3/1970 | Hermitte et al. | 426/126 X |
| 4,147,291 | 4/1979 | Akao et al. | 428/516 X |
| 4,310,578 | 1/1982 | Katsura et al. | 428/516 X |
| 4,355,721 | 10/1982 | Knott, II et al. | 428/516 X |
| 4,360,550 | 11/1982 | Asakura et al. | 428/516 X |
| 4,364,989 | 12/1982 | Moyle | 426/126 X |
| 4,626,456 | 12/1986 | Farrell et al. | 428/35 |

OTHER PUBLICATIONS

Modern Packaging Encyclopedia, McGraw Hill Inc., vol. 44, No. 7A, Jul. 1971, pp. 137 and 144–146, HF5770, P1190.2.

Primary Examiner—Michael W. Ball
Assistant Examiner—Thomas Bokan
Attorney, Agent, or Firm—Paul R. Audet; Thomas D. Wilhelm

[57] ABSTRACT

An improved package and method of packaging, including an oil-containing product, includes a multiple layer packaging sheet material which has reduced sensitivity to cockling. The multiple layer sheet material includes a layer which is susceptible to being swelled when in contact with oil, giving a cockled appearance. With reference to the package structure, the sheet material also includes a layer which impedes penetration of oil, the impeding layer being between the oil-containing product and the layer which is susceptible to being swelled when in contact with oil. The impeding layer comprises polypropylene.

5 Claims, 1 Drawing Sheet

METHOD FOR MAKING PACKAGE HAVING OIL-CONTAINING PRODUCT

This application is a continuation of application Ser. No. 773,085 filed Sept. 4, 1985, now abandoned, which is a continuation of application Ser. No. 611,482 filed May 17, 1984, now abandoned, which is a division of application Ser. No. 464,691 filed Feb. 7, 1983 and which was issued as U.S. Pat. No. 4,491,598 on Jan. 1, 1985.

BACKGROUND OF THE INVENTION

This invention relates to the packaging of products containing oils in packages using flexible sheet materials. This invention is particularly applicable to such products which are sensitive to moisture, and which require that the package material serve to protect them from infusion of moisture from the outside environment. Such products have conventionally been packaged in glassine-based sheet structures. More recently, all-plastic structures have been used to advantage to improve product quality through increased protection from infusions from the outside environment. The industry has been struggling with the problem that certain ones of the plastic packaging structures, while providing excellent protection to the product, are showing severe cockling during the normal shelf life of the product. The term cockling as used herein means to have ripples or puckers, usually due to some uneven tension, and the uneven tension yielding a surface that is not smooth, but, rather, is uneven and wavy.

Thus it is an object of this invention to provide a package having a plastic sheet structure which has reduced tendency to cockle upon contact with oil.

It is another object to provide, in such a package, good protection from gaseous infusions from the outside environment; especially infusions of oxygen and moisture vapor.

SUMMARY OF THE INVENTION

The inventors have surprisingly found that the problem of cockling can be associated with one of the more desirable barrier materials in a multiple-layer film, namely high density polyethylene (HDPE). HDPE is an excellent, and economical barrier to transmission of water vapor. The inventors have discovered, however, that a relatively thick HDPE layer in the film is responsible for the observed cockling. They have discovered that, in packages of oil-containing products such as potato chips, which conventionally touch the packaging material at spaced locations, at places where the chips touch the packaging material, oil is transferred from the surface of the packaging material. Their discoveries show that this oil can penetrate certain of the packaging material layers. In conventional packaging materials, the oil is able to penetrate to the HDPE layer. The HDPE layer absorbs oil, and retains it, creating localized swellings in the HDPE layer wherever the oil-containing product touches the packaging material. These localized swellings manifest themselves as cockling of the packaging material. A typical sheet structure susceptible to such problems is one having the following structure, and being 1.6 to 2.0 mils thick. EVOH is ethylene vinyl alcohol copolymer.

/EVOH/adhesive/HDPE/HDPE/sealant/

A typical, and effectively heat sealing sealant layer is a blend of ionomer, HDPE, and ethylene vinyl acetate (EVA). This structure, however, is susceptible to cockling.

Once the HDPE was discovered as being the susceptible layer, several possible solutions were considered. One consideration was deletion of HDPE from the structure. This was not acceptable because of its desirable function as a moisture barrier. Another consideration was to accept the oil absorption and add stiffening layers to the film so that the cockling would be physically restrained by the sheet stiffness. While this might work, it would add excessive cost to the package. Still another consideration was to make the sealant layer thicker to provide a longer path for the oil to travel to reach the HDPE layer. Again, cost factors ruled out this consideration.

Finally, the inventors herein determined that the easiest, and indeed, the most economical method of solving the cockling problem would be to find a material which could be introduced between the HDPE layer and the oil-containing product to impede the penetration of oil to the HDPE. Thus, different sealant materials were tried. Of all the polymers substituted for the conventional sealant layer, all except one family of polymers failed to improve the cockling problem. Materials tried, and found unacceptable, were EVA, ionomer, maleic anhydride, ethylene methyl acrylate (EMA), low density polyethylene (LDPE), linear low density polyethylene (LLDPE), a blend of 50% by weight ionomer and 50% polypropylene, a blend of 20% (EVOH) and 80% EMA, and a blend of 50% EVOH and 50% EAA.

As a result of these extensive studies the inventors have discovered multiple-layer packaging sheet materials which impede cockling, satisfactory to meet the standards of the snack industry, in the packaging of oil-containing products. The sheet materials have in common a first layer which is susceptible to absorption of oil and swelling upon absorption of the oil. The composition of that first layer comprises HDPE. A second layer is positioned such that, in the package, it is between the first layer and the product. The second layer comprises the sealant layer and is polypropylene. The term polypropylene (PP), as used herein in connection with the second layer, includes homopolymers, copolymers and blends which include at least 70% propylene moieties.

By using PP as the sealant layer, the cockling problem is substantially reduced. The packages of this invention then, have, from the inside of the package structure, out: the oil-containing product, PP, HDPE, adhesive, and an oxygen barrier layer. Optionally, the HDPE layer may be provided as two separate streams. Also as another and independent option, the oxygen barrier layer may have added thereto, an additional layer of an abuse resistant material such as oriented polypropylene, with an intervening adhesive layer.

DETAILED DESCRIPTION OF THE INVENTION

Figure 1:
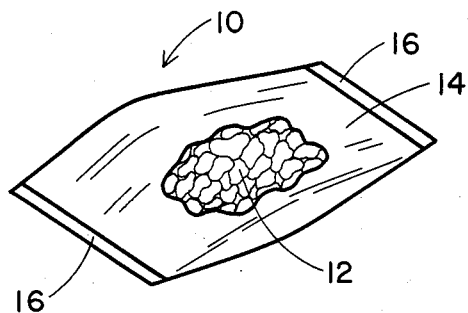
FIG. 1 shows a pictorial view of a package of this invention, with part of the packaging material cut away to show the enclosed product.

Turning now to the invention in detail, FIG. 1 represents a typical application of the packaging of the invention. A package 10 includes the oil-containing product 12, in this case shown as potato chips, and the enclosing flexible packaging film 14. The package is heat sealed closed along one longitudinal seam, not shown, and by heat seals 16 on each end of the package.

Figure 2:
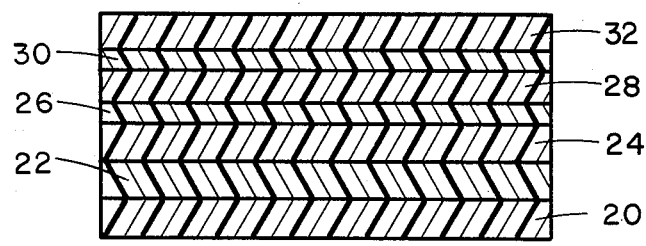
FIG. 2 shows a cross-section of a preferred embodiment of the packaging sheet material useful in the invention.
Figure 3:
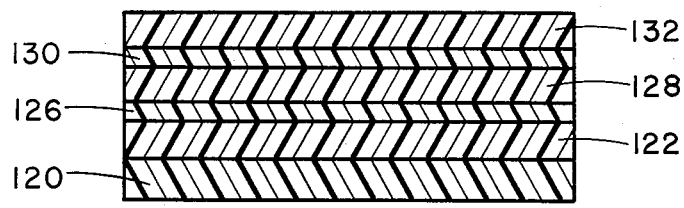
FIG. 3 shows a cross-section of another embodiment of the packaging sheet material useful in the invention.
Figure 4:
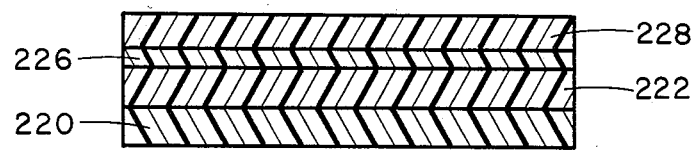
FIG. 4 shows a cross-section of yet another embodiment of the packaging sheet material useful in the invention.

FIGS. 2, 3, and 4 show illustrative cross-sections of sheet structures useful in this invention. Referring now to FIG. 2, layer 20 is a heat sealable polypropylene layer and forms the seals necessary in making the bag. Layer 22 is a first layer of HDPE. Layer 24 is a second layer of HDPE. Layer 26 is a first adhesive layer. Layer 28 is a polymer selected for its barrier properties to transmission of gaseous media, such as oxygen, which media may be detrimental to the contained product. Layer 30 is a second adhesive layer. Layer 32 is an abuse resistant layer.

Addressing now each layer in detail, the packages of this invention all have in common at least one layer containing HDPE, whose composition is susceptible to absorption of oil and swelling upon that absorption. In the FIG. 2 structure, layers 22 and 24 have that susceptibility. The compositions of layers 22 and 24 may be entirely HDPE or they may be polymeric blends having a high percentage of HDPE. Specifically contemplated are compositions having blended-in coloring concentrates in carriers other than HDPE. Other polymer compositions may exhibit the same problem of oil susceptibility. It would then be obvious to apply the same solution herein described.

Layer 20 serves dual functions as a heat sealable layer and as a layer impeding transmission of the oil contained in the product 12. The layer 20 composition is primarily polypropylene. Its composition may include polypropylene copolymers and blends of up to 10% by weight of other blend-compatible polymers. A preferred composition for layer 20 is a propylene ethylene copolymer containing 2.5% to 3.5% by weight ethylene. In addition, layer 20 may include conventional additives to improve processing of the film; exemplary are additives such as slip and anti-block agents.

Layer 28 is a barrier to gaseous transmission through the packaging film. While the composition of layer 28 may be selected with substantial freedom, and is not critical to the invention, the most commonly used barrier composition is EVOH, which provides an excellent barrier to oxygen. An alternate barrier composition, which is particularly facile to use where the oxygen barrier requirement is not so severe, is nylon.

Layer 32 is chosen for its abuse resistance, clarity, and gloss; as it serves as the exterior layer as in the package 10 of FIG. 1. While the composition of layer 32 may be selected with substantial freedom, and is not critical to the invention, the preferred material of choice is oriented polypropylene (OPP). Another, though more expensive, material is oriented polyester.

The selection of compositions for use in adhesive layer 26 and 30 depends upon the selections of compositions for layers 28 and 32, and to some extent, depends upon the exact composition of layer 24. Those skilled in the art of multiple layer polymeric films will recognize those adhesives which can be used to advantage to ensure good interlayer adhesion. Typical adhesives are olefin based polymers and copolymers, usually having some carboxyl-type modifications. Examples of these are those sold under the trade names of Admer, Plexar, CXA and AP.

FIG. 3 represents a structure similar in all respects to the FIG. 2 structure with the deletion of one of the HDPE layers. Thus the 100-series numbered layers in FIG. 3 correspond directly to the respective double digit numbered layers in FIG. 2. Layer 120 is a polypropylene sealant layer. Layer 122 has a composition comprising a high percentage of HDPE. Layer 128 is an oxygen barrier layer such as EVOH or nylon. Layer 132 is an abuse resistant layer, such as OPP. Layers 126 and 130 are adhesive layers selected for their capability to ensure good interlayer adhesion.

FIG. 4 represents a structure similar in all respects to the FIG. 3 structure with the deletion of the abuse resistant outer layer and the second adhesive layer; such that the barrier layer, as at 128 in FIG. 3 is now used to perform a second function of directly contacting the outside environment relative to the bag 10. The 200-series numbered layers in FIG. 4 correspond directly to the respective 100-series numbered layers in FIG. 3. Layer 220 is a polypropylene sealant layer. Layer 222 has a composition comprising a high percentage of HDPE. Layer 228 is an oxygen barrier layer such as EVOH or nylon. Layer 226 is an adhesive layer selected for its capability to ensure good interlayer adhesions.

In light of the foregoing teaching, those skilled in the art will appreciate that the mechanism for controlling the tendency of films containing HDPE to cockle is embodied in the selection of polypropylene as the controlling agent and in the positioning of the polypropylene between the oil-containing product and the HDPE. Thus any layers in the film enclosing the oil-containing product, in addition to the PP and HDPE layers, are optional in the sense that they serve functions other than that of controlling the tendency of the HDPE to cockle. Thus, while the FIG. 2 structure is represented as a preferred structure, the structures of FIGS. 3 and 4 are also highly acceptable. Indeed, the invention may be presented in even simpler form. Referring to FIG. 4, the gas barrier layer 228 may also be deleted. Attendant that deletion, the adhesive layer 226 may also be deleted, such that the remaining film, in the simplest film useful in the invention is a two-layer film comprising a layer of PP and a layer of HDPE. The two-layer structure, of course, would have limited use, since it lacks any major functionality as an oxygen barrier. But such a film would have use for packaging other products which are not sensitive to gaseous infusion during their shelf life, and which are subjected to only limited abuse.

Having thus described the invention in its simplest form, it will be seen by those skilled in the art that a variety of additional layers may be incorporated into the film in order to provide their own functional benefits to the overall film structure.

Thus is seen the incorporation of the oxygen barrier as in the FIG. 3 structure, and the additional incorporation of the abuse resistant layer as in FIG. 2. The inclusion of these additional layers is, of course, accomplished with effective interlayer adhesion, which may be achieved by known conventional processes. Given the identity of the layers to be incorporated into a film to meet certain functional needs, those skilled in the art of multiple layer films containing polymer layers will recognize the preferred methods of adhesion, and know which adhesives are effective in achieving the desired levels of adhesive. Exemplary processes for incorporating film layers in addition to the PP aand the HDPE layers are coextrusion, and extrusion and coextrusion lamination. Other methods will be obvious to those skilled in the art.

In order for the cockling problem to be significant in terms of appearance, the substance which is susceptible to oil absorption, and the attendant cockling, must be present as a significant percentage of the overall multiple layer film. Each of the films of this invention has the HDPE present as over half of the weight content of the film. Typically, the layers susceptible to exhibiting the cockling phenomenon comprise 50% to 75% of the film.

EXAMPLE

A structure of the nature of that shown in FIG. 2 was made by a combination of processes comprising coextrusion followed by extrusion lamination. In a first process, five extruders were utilized to coextrude a 2 mil thick, five layer structure corresponding to layers 20, 22, 24, 26 and 28 of FIG. 2. Layer 20 was a propylene ethylene copolymer having 2.5% ethylene. Layer 22 was HDPE homopolymer. Layer 24 was HDPE homopolymer with 15% of a color concentrate in an LDPE concentrate base. Layer 26 was anhydride modified EVA. Layer 28 was EVOH copolymer. The thus coextruded 2 mil film was, by layer thickness 20% PP layer 20, 65% HDPE as layers 22 and 24, 5% adhesive as layer 26 and 10% EVOH as layer 28. A layer of 45 gauge OPP—corresponding to layer 32 in FIG. 2—was then extrusion laminated to the EVOH layer using LDPE as the laminant, and corresponding to layer 30 in FIG. 2.

A comparative film was made to be identical except that the composition of its sealant layer—corresponding to layer 20 of FIG. 2 was a blend of ionomer, EVA and HDPE. In a second comparative film, otherwise identical, the sealant layer was ionomer.

The films were then made into packages containing potato chips as shown in FIG. 1, and stored at accelerated aging conditions of 100° F., 20% relative humidity. The packages were inspected periodically and judged regarding the degree of cockling observed. Based on these inspections, the packages were rated on a scale of 1 to 5, with 1 representing no observable cockling, and 5 representing severe cockling. Table 1 shows the results of the ratings.

TABLE 1

| Example I. D. | Sealant Layer Compositions | Rating at Time Shown | | | |
|---|---|---|---|---|---|
| | | 48 Hrs. | 73 Hrs. | 92 Hrs. | 139 Hrs. |
| Invention | PP | 2 | 2 | 2 | 2 |
| Comparative Example 1 | Blend of ionomer, EVA, HDPE | 4 | 5 | 5 | 5 |
| Comparative Example 2 | Ionomer | 2 | 3 | 3 | 4 |

The results in Table 1 show that the polypropylene sealant layer was effective in reducing the cockling over an extended period of time under accelerated aging conditions. It should be noted that the snack industry generally considers that, at maximum, a 72 hr. test is indicative of acceptability of a packaging material if it scores "2" or better on the rating. It is seen that both of the comparative examples failed at 73 hours, while the example of the invention continued to meet the required rating after 139 hours.

Thus it is seen that the invention provides an improved multiple layer sheet material for use in packages with oil-containing products. The improved sheet material, when used in this packaging application exhibits reduced tendency to cockle upon contact with oil, even under extended accelerated aging tests. The inclusion of either EVOH or nylon in the package structure provides good protection from oxygen infusion. The inclusion of HDPE in the structure provides good protection from water vapor infusion.

Having thus described the invention, what is claimed is:

1. A package, comprising:
 (a) a product containing an oil; and
 (b) a flexible sheet material having a plurality of layers and wherein the layers are adhered to each other, said sheet material having a first surface thereof on the exterior of said package and a second surface thereof on the interior of said package and adjacent said product, said flexible sheet material comprising (i) a first layer of high density polyethylene, the thickness of said first layer being at least about 50% of the thickness of said sheet material, said product touching said sheet material at spaced locations, said high density polyethylene being susceptible to absorption of said oil and being susceptible to swelling at corresponding spaced locations in said first layer upon absorption of said oil, such that said package is susceptible of exhibiting a cockled appearance, and (ii) a second layer of polypropylene as the layer on said second interior surface, said second layer of polypropylene being between said first layer and said product, said second layer of polypropylene functioning to reduce the susceptibility of said package to cockling.

2. A package as in claim 1 and including a third barrier layer adhered to the surface of said first layer more remote from said second layer, said third layer being an effective barrier to transmission of gaseous media.

3. A package as in claim 2 and including a second layer of high density polyethylene interposed between said first and second layers.

4. A package as in claim 2 wherein the composition of said third layer is chosen from the group consisting of nylon and ethylene vinyl alcohol.

5. A package as in claim 1 wherein said package is sealed by heat seals and wherein said second layer forms the heat seals.

* * * * *